(No Model.)

P. N. RADEMANN.
WINDOW SHADE BRACKET HOLDER.

No. 606,299. Patented June 28, 1898.

Witnesses
C. Seiffert
Rosann Smith

Inventor
Paul N. Rademann.
per L. G. Susemihl,
Attorney

UNITED STATES PATENT OFFICE.

PAUL N. RADEMANN, OF DAVENPORT, IOWA.

WINDOW-SHADE-BRACKET HOLDER.

SPECIFICATION forming part of Letters Patent No. 606,299, dated June 28, 1898.

Application filed December 11, 1897. Serial No. 661,488. (No model.)

*To all whom it may concern:*

Be it known that I, PAUL N. RADEMANN, a citizen of the United States, residing at Davenport, in the county of Scott and State of Iowa, have invented certain new and useful Improvements in Window-Shade-Bracket Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in window-shade-bracket holders; and it consists in a plate which is to be fastened to the window-frame and which has its central portion stamped or pressed inwardly out of line with the outer face of the plate combined with the bracket which is inserted between the edges of the plate and the inwardly-pressed portion, the bracket being adjustable back and forth, as will be more fully described hereinafter.

The object of my invention is to provide a bracket-holder for window-shades by means of which the bracket can be adjusted back and forth to accommodate different lengths of shade-rollers, and thus do away with the necessity of having to adjust the bracket upon the window-frame and to disfigure the frame with holes made to receive the screws by which the bracket is held in position.

Figure 1:
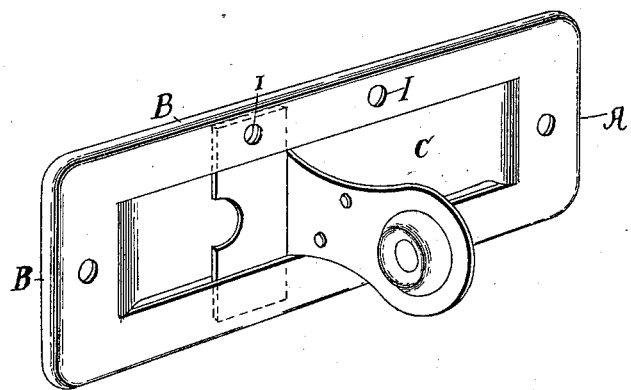
Figure 2:
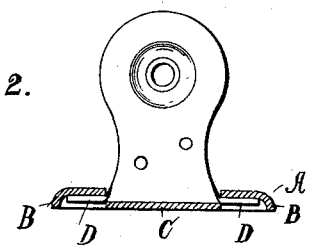

In the accompanying drawings, Figure 1 is a perspective of a bracket-holder which embodies my invention. Fig. 2 is a vertical cross-section taken through the plate to one side of the bracket.

A represents the bracket-holder, which is formed from a plate of any suitable metal and which has its edges B turned over all the way around, so as to form a bearing against the window-frame. This flange is preferable, because it prevents the central stamped-in portion C from coming in contact with the window-frame and to prevent the ends of the plate from being bent in case the screws are forced into the frame farther than is necessary at each end.

The central portion C is pressed inwardly below the outer surface of the plate after suitable slits have been cut in the plate, so as to separate this central portion from the plate along its sides, as shown in Fig. 2. The central portion is forced inwardly just sufficiently far to allow the ends D of the bracket G to be passed through the slits and to be held between the central portion C and the edges of the plate A. This central portion C being forced inwardly from one end of the cuts to the other the bracket can be moved back and forth in the slits in order to accommodate the length of the shade-roller that is being used. The friction exerted upon the ends of the bracket by the edges of the plate A and against the bottom of the bracket by the central portion C is sufficient to hold the bracket in any desired position.

Through the ends of the plate A are made holes through which the screws are passed which fasten the plate in position, and through the top edge of the plate are made two other screw-holes I I. When the bracket is to the left of the center, the screw may be placed in the right-hand hole and turned into the window-casing where the plate is to be located, and if the bracket is to the right of the center the left-hand hole is used. This will press the upper edge of the plate closer to the central portion C, thus binding the bracket between them and holding it firmly in position. One holder is used on each side of the window to receive the two brackets used with each curtain. Any bracket having a reasonably thin base or foot of the customary form may be used in connection with this holder.

By the use of my invention all necessity for marring the casing with numerous screw-holes when it is desired to change the location of the bracket is entirely done away with and the bracket can be moved freely back and forth upon the plate, and thus accommodate rollers of different lengths.

Having thus described my invention, I claim—

1. In a window-shade bracket, a plate, having its edges turned inwardly so as to bear against the casing, a central depressed portion provided with two parallel slits or slots, so as to separate the central depressed portion from the outer raised edges, combined with an adjustable bracket which has its ends inserted into the slots, substantially as shown.

2. In a window-shade bracket, a plate having two longitudinal parallel slits or slots, combined with an adjustable bracket having its inner portion turned outwardly at an angle, and its two opposite projecting ends to catch in said slits or slots, substantially as described.

In testimony whereof I affix my signature in presence of two witnesses.

PAUL N. RADEMANN.

Witnesses:
   THEO. H. LEMBRECHT,
   E. C. SUSEMIHL.